(12) United States Patent
Liu

(10) Patent No.: US 7,922,387 B2
(45) Date of Patent: Apr. 12, 2011

(54) PERFORMANCE TESTING APPARATUS FOR HEAT PIPES

(75) Inventor: Tay-Jian Liu, Taipei Hsien (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 448 days.

(21) Appl. No.: 12/168,867

(22) Filed: Jul. 7, 2008

(65) Prior Publication Data

US 2009/0161723 A1 Jun. 25, 2009

(30) Foreign Application Priority Data

Dec. 21, 2007 (TW) ................................ 96149347 A

(51) Int. Cl.
*G01K 13/00* (2006.01)
*G01N 25/00* (2006.01)
(52) U.S. Cl. .............................. 374/147; 374/5; 374/208
(58) Field of Classification Search .................. 374/147, 374/5, 208
See application file for complete search history.

(56) References Cited

U.S. PATENT DOCUMENTS

| | | | |
|---|---|---|---|
| 2005/0220168 A1* | 10/2005 | Chien | 374/29 |
| 2007/0005995 A1* | 1/2007 | Kardach et al. | 713/300 |
| 2007/0047614 A1* | 3/2007 | Lee et al. | 374/44 |
| 2007/0110121 A1* | 5/2007 | Hsu | 374/147 |
| 2007/0153872 A1* | 7/2007 | Wu | 374/148 |
| 2009/0116538 A1* | 5/2009 | Liu | 374/147 |
| 2009/0190627 A1* | 7/2009 | Liu | 374/147 |
| 2009/0196325 A1* | 8/2009 | Liu | 374/147 |

* cited by examiner

*Primary Examiner* — Lisa M Caputo
*Assistant Examiner* — Mirellys Jagan
(74) *Attorney, Agent, or Firm* — Frank R. Niranjan

(57) ABSTRACT

A performance testing apparatus for a heat pipe includes a heating set, a cooling set, and a supporting set supporting the heating set and the cooling set thereon. Position and orientation of the heating and cooling sets on the supporting set are adjustable. The heating set includes a first immovable portion and a first movable portion cooperatively defining a first channel therebetween for receiving an evaporating section of the heat pipe. A temperature sensor is exposed to the first channel for detecting temperature of the evaporating section. A cooling set includes a second immovable portion and a second movable portion cooperatively defining a second channel therebetween for receiving a condensing section of the heat pipe. A temperature sensor is exposed to the second channel for detecting temperature of the condensing section of the heat pipe.

17 Claims, 10 Drawing Sheets

PERFORMANCE TESTING APPARATUS FOR HEAT PIPES

BACKGROUND OF THE INVENTION

1. Field of the Invention

The present invention relates generally to testing apparatuses, and more particularly to a performance testing apparatus for heat pipes.

2. Description of Related Art

It is well known that a heat pipe is generally a vacuum-sealed pipe. A porous wick structure is provided on an inner face of the pipe, and phase changeable working media employed to carry heat is included in the pipe. Generally, according to where the heat is input or output, a heat pipe has three sections: an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters in evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

A typical method for testing the performance of a heat pipe is to first insert the evaporating section of the heat pipe into a liquid at constant temperature; after a period of time the temperature of the heat pipe will become stable, then a temperature sensor such as a thermocouple, a resistance thermometer detector (RTD) or the like can be used to measure $\Delta T$ between the liquid and the condensing section of the heat pipe to evaluate the performance of the heat pipe. However, Rth and Qmax can not be obtained by this test, and the performance of the heat pipe can not be reflected exactly by this test.

Referring to FIG. 10, a related performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. At the same time, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions on the heat pipe 2.

However, in the test, the related testing apparatus has the following drawbacks: a) it is difficult to accurately determine lengths of the evaporating section 2a and the condensing section 2b which are important factors in determining the performance of the heat pipe 2; b) heat transference and temperature measurement may easily be affected by environmental conditions; and, c) it is difficult to achieve sufficiently intimate contact between the heat pipe and the heat source and between the heat pipe and the heat sink, which results in uneven performance test results of the heat pipe. Furthermore, due to awkward and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; therefore, the apparatus not only requires good testing accuracy, but also requires easy and accurate assembly to the heat pipes to be tested. The testing apparatus affects the yield and cost of the heat pipes directly; therefore, testing accuracy, facility, speed, consistency, reproducibility and reliability need to be considered when choosing the testing apparatus. Therefore, the testing apparatus needs to be improved in order to meet the demand for mass production of heat pipes.

What is needed, therefore, is a high performance testing apparatus for heat pipes suitable for use in mass production of heat pipes.

SUMMARY OF THE INVENTION

A performance testing apparatus for heat pipes in accordance with a first embodiment of the present invention comprises a heating set for heating an evaporating section of the heat pipe, a cooling set for cooling a condensing section of the heat pipe, and a supporting set adjustably supporting the heating set and the cooling set thereon. The heating set comprises a first immovable portion and a first movable portion capable of moving relative to the first immovable portion. A first channel is defined between the first immovable portion and the first movable portion for receiving the evaporating section of the heat pipe. A temperature sensor is attached to one of the first immovable portion and the first movable portion and exposed to the first channel for detecting temperature of the evaporating section of the heat pipe. A cooling set comprises a second immovable portion and a second movable portion capable of moving relative to the second immovable portion. A second channel is defined between the second immovable portion and the second movable portion for receiving a condensing section of the heat pipe. A temperature sensor is attached to one of the second immovable portion and the second movable portion and exposed to the second channel for detecting temperature of the condensing section of the heat pipe. The supporting set has a supporting platform on which the heating and cooling sets are mounted. Positions and orientations of the heating and cooling sets on the supporting frame are changeable so that the performance testing apparatus can be used to test heat pipes having different configurations, such as linear configuration, L-shaped configuration and U-shaped configuration.

BRIEF DESCRIPTION OF THE DRAWINGS

Many aspects of the present performance testing apparatus for heat pipes can be better understood with reference to the following drawings. The components in the drawings are not necessarily drawn to scale, the emphasis instead being placed upon clearly illustrating the principles of the present performance testing apparatus for heat pipes. Moreover, in the drawings, like reference numerals designate corresponding parts throughout the several views.

DETAILED DESCRIPTION OF THE INVENTION

Figure 1:
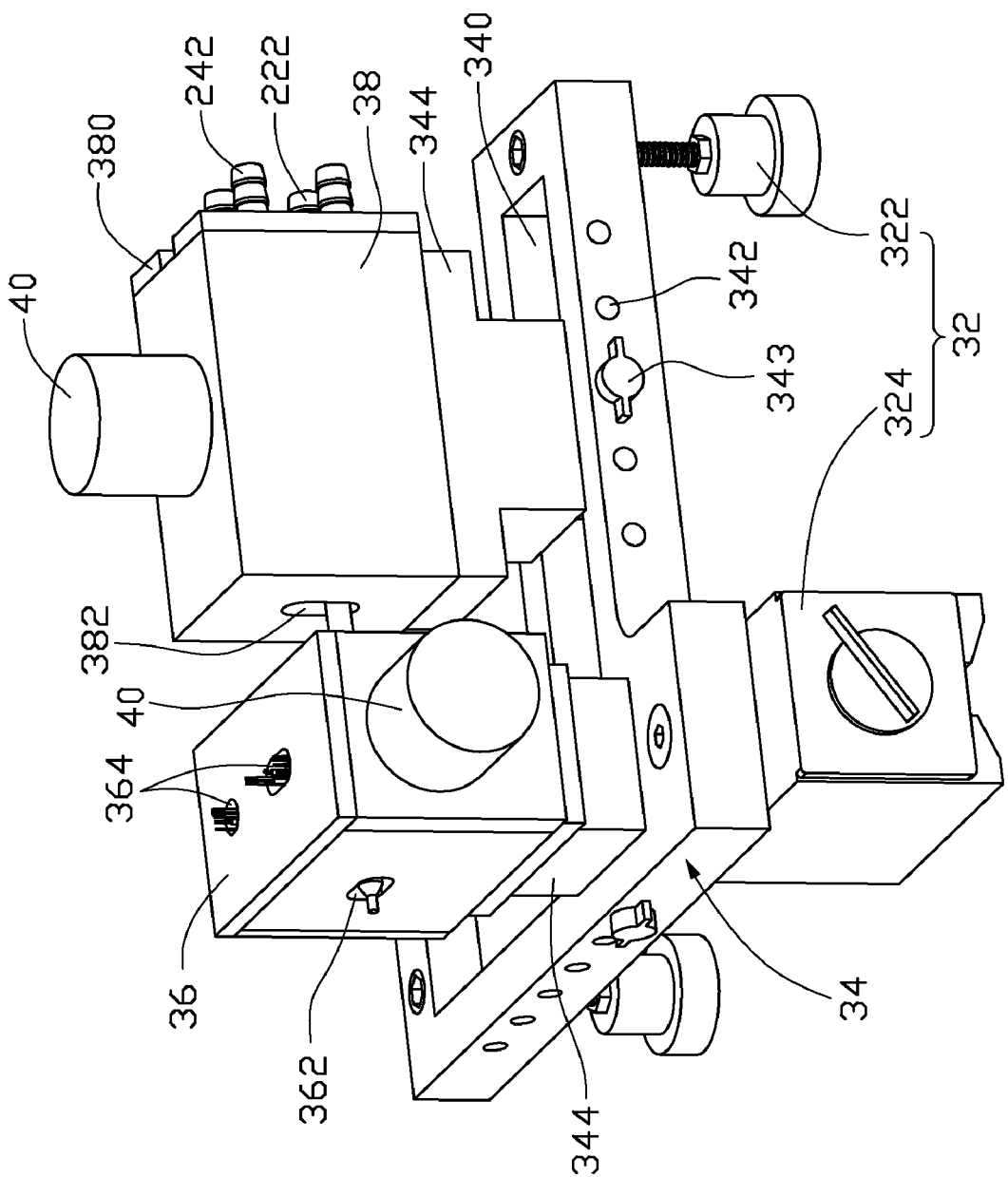
FIG. 1 is an assembled view of a performance testing apparatus for heat pipes in accordance with a first embodiment of the present invention.
Figure 2:
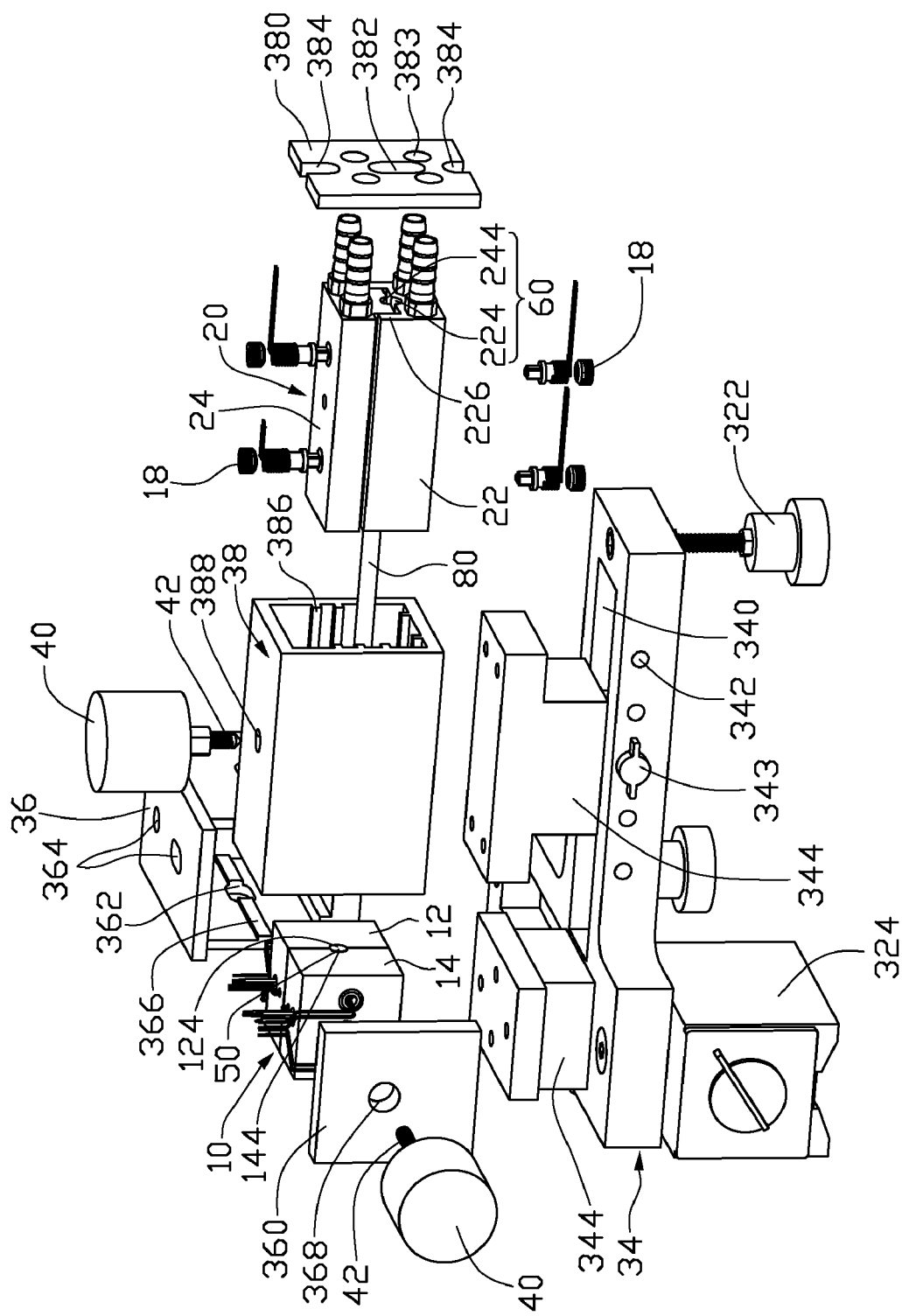
FIG. 2 is an exploded, isometric view of the performance testing apparatus for heat pipes of FIG. 1.
Figure 3:
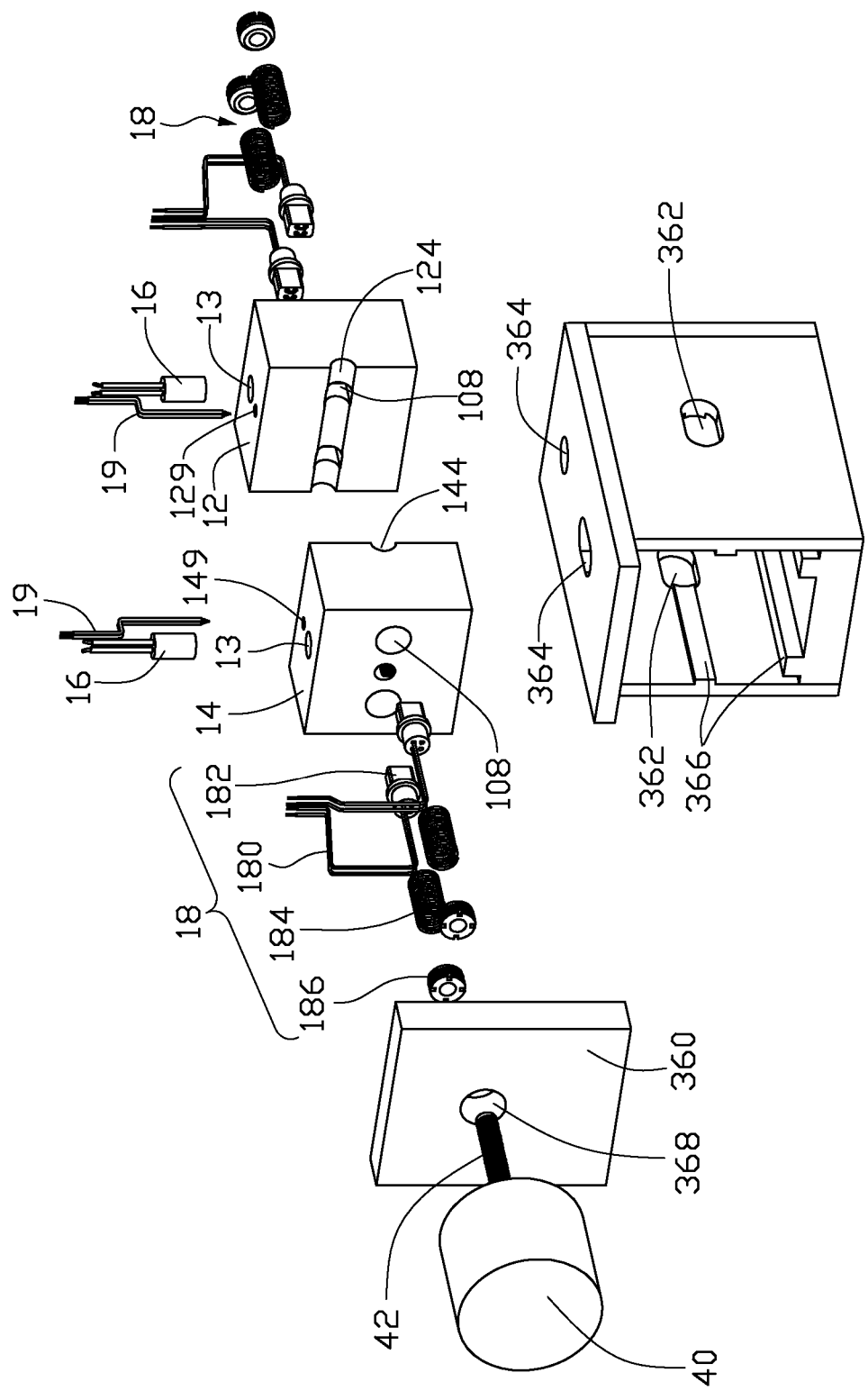
FIG. 3 is a heating set and a first enclosure of the performance testing apparatus for heat pipes of FIG. 2.

Referring to FIGS. 1-3, a performance testing apparatus for heat pipes in accordance with a first embodiment of the present invention is shown. The testing apparatus comprises a heating set 10 for heating an evaporating section of a heat pipe, a cooling set 20 for cooling a condensing section of the heat pipe, and a supporting set 30 supporting the heating set 10 and the cooling set 20 thereon. The performance testing apparatus is put on a platform (not shown) of a supporting member (not shown) such as a testing table (not shown) and so on.

The heating set 10 comprises an immovable portion 12 and a movable portion 14 in juxtaposition with the first immovable portion 12 in a latitudinal direction. The first movable portion 14 is movable relative to the first immovable portion 12.

The first immovable portion 12 is made of material having good heat conductivity. A first heating member 16 such as an immersion heater, resistance coil, quartz tube and Positive temperature coefficient (PTC) material or the like is embedded in the first immovable portion 12. The first immovable portion 12 has a centre defining a hole 13 in a top portion thereof. In this embodiment, the first heating member 16 is an elongated cylinder and is accommodated in the hole 13 of the first immovable portion 12. Two spaced wires (not shown) extend beyond the first immovable portion 12 from an upper end of the first heating member 16 for connecting with a power supply (not shown). The first immovable portion 12 defines an aperture 129 at a side of and parallel to the first heating member 16. A first temperature sensor 19 is accommodated in the aperture 129 for detecting temperature of the first heating member 16. The first immovable portion 12 has a heating groove 124 defined in a first lateral face (not labeled) thereof. The first immovable portion 12 defines two spaced through holes 108 extending through the first immovable portion 12 from a second lateral face to the first lateral face thereof. The through holes 108 are perpendicular to the hole 13. The though holes 108 are in communication with the groove 124. Two second temperature sensors 18 are accommodated in corresponding through holes 108 and have detecting sections thereof exposed to groove 124. The second temperature sensors 18 have wires (not labeled) thereof extending upwardly and located adjacent to the wires of the first heating member 16. The first heating member 16, the second temperature sensor 18 and the groove 124 are perpendicular to each other; in this manner, a size of the first immovable portion 12 is small, which economizes material for making the first immovable portion 12 and lowers a cost of the first immovable portion 12.

The first movable portion 14 is also made of material having good heat conductivity. The first movable portion 14 has a configuration similar to that of the first immovable portion 12. A second heating member 16 such as an immersion heater, resistance coil, quartz tube and Positive temperature coefficient (PTC) material or the like is embedded in the first movable portion 14. The first movable portion 14 has a centre defining a hole 13 in a top portion thereof. The second heating member 16 is accommodated in the hole 13 of the first movable portion 14. The first movable portion 14 defines an aperture 149 at a side of and parallel to the second heating member 16. Another first temperature sensor 19 is accommodated in the aperture 149 for detecting temperature of the second heating member 16. The first movable portion 14 has a heating groove 144 defined in a first lateral face (not labeled) thereof. The heating groove 144 cooperates with the heating groove 124 of the first immovable portion 12 to define a first channel 50 for receiving the evaporating section of the heat pipe to be tested therein. The first movable portion 14 defines two spaced through holes 108 extending through the first movable portion 14 from a second lateral face to the first lateral face thereof. The through holes 108 are perpendicular to the hole 13. The though holes 108 are in communication with the heating groove 144. Two second temperature sensors 18 are accommodated in corresponding through holes 108 and have detecting sections thereof exposed to the heating groove 144 for detecting temperature of the evaporating section of the heat pipe in test. The detecting portions of the second temperature sensors 18 are capable of automatically contacting the evaporating section of the heat pipe. The second temperature sensors 18 have wires (not labeled) thereof extending upwardly and located adjacent to the wires of the second heating member 16. An engaging hole (not labeled) is defined between the two through hole 108 in the second face of the first movable portion 14. The second heating member 16, the second temperature sensor 18 and the heating groove 144 are perpendicular to each other; in this manner, a size of the first movable portion 14 is small, which economizes material for making the first movable portion 14 and lowers a cost of the first movable portion 14.

In order to construct a thermally steady environment for testing the heat pipes, the heating set 10 is enclosed in a cuboidal first enclosure 36. The first enclosure 36 has a bottom (not labeled) positioned on the supporting set 30 and three interconnecting sidewalls (not labeled) extending upwardly from the bottom. An entrance (not labeled) is defined in an opened side of the first enclosure 36 for disposing, assembling or dismantling the first movable portion 14 and the movable portion 12 in the first enclosure 36. A door board 360 is removably attached to the entrance for facilitating the first immovable portion 12 and the first movable portion 14 to be assembled in/dissembled from the first enclosure 36. The bottom and two opposite ones of the sidewalls form a plurality of ribs 366 on inner faces thereof, for reducing contacting area between the heating set 10 and the first enclosure 36. Corresponding to the first channel 50 between the first immovable portion 12 and the first movable portion 14, openings 362 are defined in the two opposite ones of the sidewalls. A ceiling (not labeled) of the first enclosure 36 defines two through bores 364 corresponding to the heating members 16 and the first temperature sensors 19 of the first immovable portion 12 and the first movable portion 14 to allow the wires of the heating members 16, the first temperature sensors 19 and the second temperature sensors 18 to extend therethrough to connect with the power supply (not shown) and a monitoring computer (not shown). The door board 360 defines a through bore 368 corresponding to the engaging hole of the first movable portion 14. A driving device 40 comprises a bolt 42 engaging with the first movable portion 14 via the bolt 42 engaging through the bore 368 to engage in the engaging hole of the first movable portion 14, for driving the first movable portion 14 to make accurate linear movement relative to the first immovable portion 12 along the latitudinal direction, thereby realizing intimate contact between the evaporation section of the heat pipe and the first movable and immovable portions 14, 12. In this manner, heat resistance between the evaporating section of the heat pipe and the first movable and immovable portions 14, 12 can be minimized. A space (not labeled) is defined between the door board 360 and the second face of the first movable portion 14 for movement of the first movable portion 14. When the driving device 40 operates, the bolt 42 rotates and the first movable portion 14 moves horizontally relative to the first immovable portion 12 in the first enclosure 36.

The cooling set 20 comprises a second immovable portion 22 and a second movable portion 24 movably located on the second immovable portion 22.

The second immovable portion 22 is made of metal having good heat conductivity. Cooling passageways (not shown) are defined in an inner portion of the second immovable portion 22, to allow coolant to flow in the second immovable portion 22. An inlet 222 and an outlet 222 extend from a lateral side of the second immovable portion 22 to communicate the passageways with a constant temperature coolant circulating device (not shown); therefore, the passageways, inlet 222, outlet 222 and the coolant circulating device cooperatively define a cooling system for the coolant circulating through the second immovable portion 22 to remove heat from the condensing section of the heat pipe in test. The second immovable portion 22 has a cooling groove 224 defined in a top face thereof, for receiving the condensing section of the heat pipe. Two second temperature sensors 18 are inserted into through holes defined in the second immovable portion 22 from a bottom of the second immovable portion 22 so as to position detecting portions (not labeled) of the second temperature sensors 18 in the cooling groove 224. The detecting portions of the second temperature sensors 18 are capable of automatically contacting the condensing section of the heat pipe in order to detect a temperature of the condensing section of the heat pipe.

The second movable portion 24 is also made of metal having good heat conductivity. Cooling passageways (not shown) are defined in an inner portion of the second movable portion 24, to allow coolant to flow in the second movable portion 24. An inlet 242 and an outlet 242 extend from a lateral side of the second movable portion 24 to communicate the passageways with a constant temperature coolant circulating device (not shown); therefore, the passageways, the inlet 242, the outlet 242 and the coolant circulating device cooperatively define a cooling system for the coolant circulating through the second movable portion 24 to remove heat from the condensing section of the heat pipe in test. The second movable portion 24, corresponding to the cooling groove 224 of the second immovable portion 22, has a cooling groove 244 defined therein, whereby a second channel 60 is cooperatively defined by the cooling grooves 224, 244 when the second movable portion 24 moves to reach the second immovable portion 22. Thus, an intimate contact between the condensing section of the heat pipe and the second movable and immovable portions 24, 22 defining the second channel 60 can be realized, thereby reducing heat resistance between the heat pipe and the second movable and immovable portions 24, 22. Two temperature sensors 18 are inserted into through holes (not shown) defined in the second movable portion 24 from a top thereof to reach a position wherein detecting portions (not labeled) of the second temperature sensors 18 are located in the cooling groove 244 and capable of automatically contacting the condensing section of the heat pipe to detect the temperature of the condensing section of the heat pipe.

In the first embodiment of the present invention, in order to precisely positioning the second movable portion 24 relative to the immovable portion 22, the immovable portion 22 has two flanges 226 integrally extending upwardly from two opposite top edges thereof and toward the second movable portion 24. The outer face of each flange 226 is coplanar with the outer face of a main body (not labeled) of the second immovable portion 22. The two flanges 226 function as positioning structure to position the second movable portion 24 therebetween, which prevents the second movable portion 24 from deviating from the second immovable portion 22 during test of the heat pipes in mass production, thereby ensuring the cooling grooves 224, 244 of the second immovable and movable portions 22, 24 to always be aligned with each other. Thus, the second channel 60 can be always precisely and easily formed for receiving the condensing section of the heat pipe for test. Outer faces of the second movable portion 24 slideably contact the two flanges 226 of the second immovable portion 22 when the second movable portion 24 moves relative to the second immovable portion 22. Alternatively, the second movable portion 24 can have two flanges slideably engaging with two opposite sides of the second immovable portion 22 to keep the second immovable portion 22 aligned with the second movable portion 24.

The cooling set 20 is accommodated in a cuboidal second enclosure 38. The second enclosure 38 has a bottom (not labeled) positioned on the supporting set 30 and three interconnecting sidewalls (not labeled) extending upwardly from the bottom. An entrance (not labeled) is defined in an opened side of the second enclosure 38 for disposing, assembling or dismantling the second movable portion 24 and the second movable portion 22 in the second enclosure 38. A door board 380 is removably attached to the entrance for facilitating the second immovable portion 22 and the second movable portion 24 to be assembled in/dissembled from the second enclosure 38. The bottom and two opposite ones of the sidewalls form a plurality of ribs 386 on inner faces thereof, for reducing contacting area between the cooling set 20 and the second enclosure 38. A slot (not labeled) is defined between two ribs 386 of the sidewall for extension of wires of the second temperature sensor 18 to connect with the monitoring computer (not shown). Corresponding to the second channel 60 between the second immovable portion 22 and the second movable portion 24, two lengthwise openings 382 are defined in the door board 380 and one of the sidewalls of the second enclosure 38 which is located opposite the door board 380, respectively, for extension of the condensing section of heat pipe into the second channel 60 via the opening 382 or the opening of the sidewall of the second enclosure 38 which is not shown. Corresponding to the inlets, outlets 222, 242 of the second immovable portion 22 and the second movable portion 24, the second enclosure 38 defines for through bores 383 allowing the inlets, outlets, 222, 242 to extend out of the second enclosure 38. The door board 380 defines two cutouts 384 in an upper portion and a lower portion thereof for allowing wires of the second temperature sensors 18 extending therethrough to connect with the monitoring computer (not shown). A space (not labeled) is left between the second movable portion 24 and a ceiling of the second enclosure 38 for movement of the second movable portion 24. The ceiling of the second enclosure 38 defines a through hole 388 for extension of a bolt 42 of a driving device 40 therethrough to engage with the second movable portion 24 in the second enclosure 38. When the driving device 40 operates, the bolt 42 rotates and the second movable portion 24 move vertically upwardly or downwardly away from or toward the second immovable portion 22 in the second enclosure 38, thereby realizing intimate contact between the condensing section of the heat pipe and the second movable and immovable portions 24, 22. In this manner, heat resistance between the condensing section of the heat pipe and the second movable and immovable portions 24, 22 can be minimized.

The driving device 40 in the first embodiment is a step motor, although it can be easily apprehended by those skilled in the art that the driving device 40 can also be a pneumatic cylinder or a hydraulic cylinder.

The channels 50, 60 as shown in the first embodiment each have a circular cross section enabling it to receive the evaporating section or the condensing section of the heat pipe having a correspondingly circular cross section. Alternatively, the channels 50, 60 each can have a rectangular cross section where the evaporating section and condensing section of the heat pipe each also have a corresponding rectangular configuration.

The supporting set 30 comprises a supporting leg 32, a supporting platform 34 on the supporting leg 32 and two supporting seats 344 positioned on the sporting platform 34 and respectively supporting the heating set 10 and the cooling set 20 thereon.

The supporting platform 34 is a rigid member and is substantially T-shaped in figure. The supporting platform 34 defines two guiding slots 340 corresponding to the two supporting seats 344. The two guiding slots 340 receive lower portions of the two supporting seats 344 therein, respectively. The two guiding slots 340 are perpendicular to each other and cooperatively define a T-shaped configuration. The two supporting seats 344 can make linear movement along the guiding slots 340, respectively. The supporting platform 34 defines a plurality of holes 342 in two lateral sides thereof, wherein the holes 342 communicate with the guiding slots 340. Corresponding to each supporting seat 344, a positioning bolt 343 is received in one of the holes 342 and can engage with the lower portion of the supporting seat 344. The bolt 343 is received in an appropriate one of the holes 342 and secures the supporting seat 344 to be fixedly located at an appropriate position of the supporting platform 34 according to configuration and size of the heat pipe to be tested.

The supporting leg 32 comprises an electromagnetic holding chuck 324 supporting an end of the supporting platform 34 and two adjustable feet 322 supporting other two ends of the supporting platform 34. The testing apparatus can be easily fixed at any desired position by the electromagnetic holding chuck 324.

In use, an example according to the first embodiment of the present invention is to test performance of a linear heat pipe 80. The heat pipe 80 has an evaporation section at an end thereof and a condensing section at an opposite end thereof. The supporting set 30 is adjusted by adjusting the two supporting seats 344 so that the first channel 50 of the heating set 10 is aligned with the second channel 60 of the cooling set 20. The condensing section of the heat pipe 80 is brought to extend through the openings 362 defined in the two opposite ones of the sidewalls of the first enclosure 36, the first channel 50 of the heating set 10 and the opening 382 defined in one sidewall of the second enclosure 38 to be received in the second channel 60 of the cooling set 20. The evaporating section of the heat pipe 80 extends through an outer one of the openings 362 of the sidewalls of the first enclosure 36 to be received in the first channel 50 of the heating set 10. The driving devices 40 drive the first, second movable portions 14, 24 to move relative to the first, second immovable portions 12, 22 to allow the evaporating section and the condensing section of the heat pipe 80 to have an intimate contact with corresponding heating set 10 and cooling set 20. The power supply energizes the heating members 16 of the heating set 10, and the evaporating section is heated. The coolant circulates in the cooling set 20, and the condensing section is cooled. The first, second temperature sensors 19, 18 work and detect temperature of the evaporating section and condensing section of the heat pipe 80. Therefore, performance of the heat pipe can be obtained from the monitoring computer.

Figure 4:
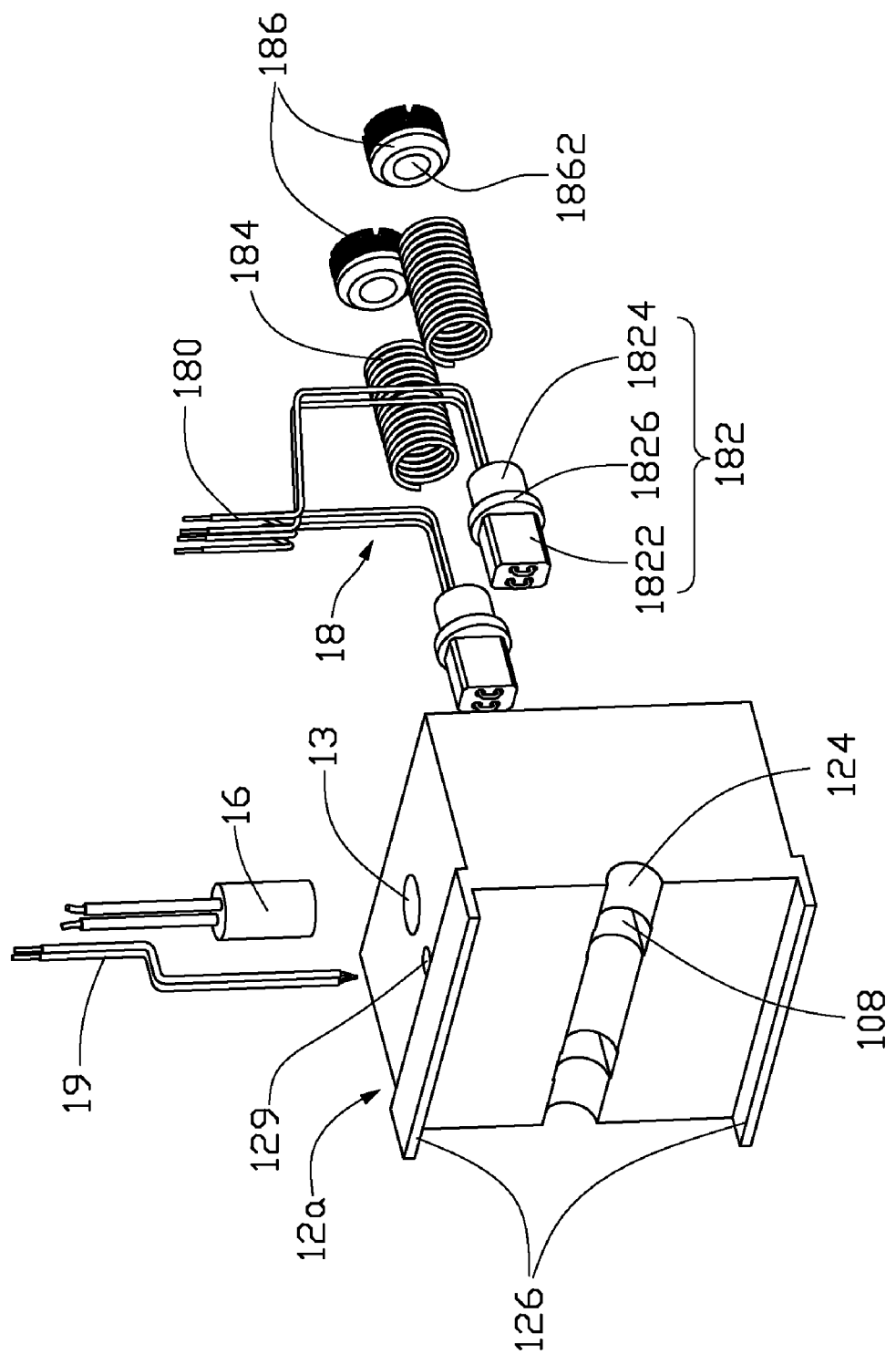
FIG. 4 is an alternative embodiment of an immovable portion of the heating set of FIG. 3.
Figure 5:
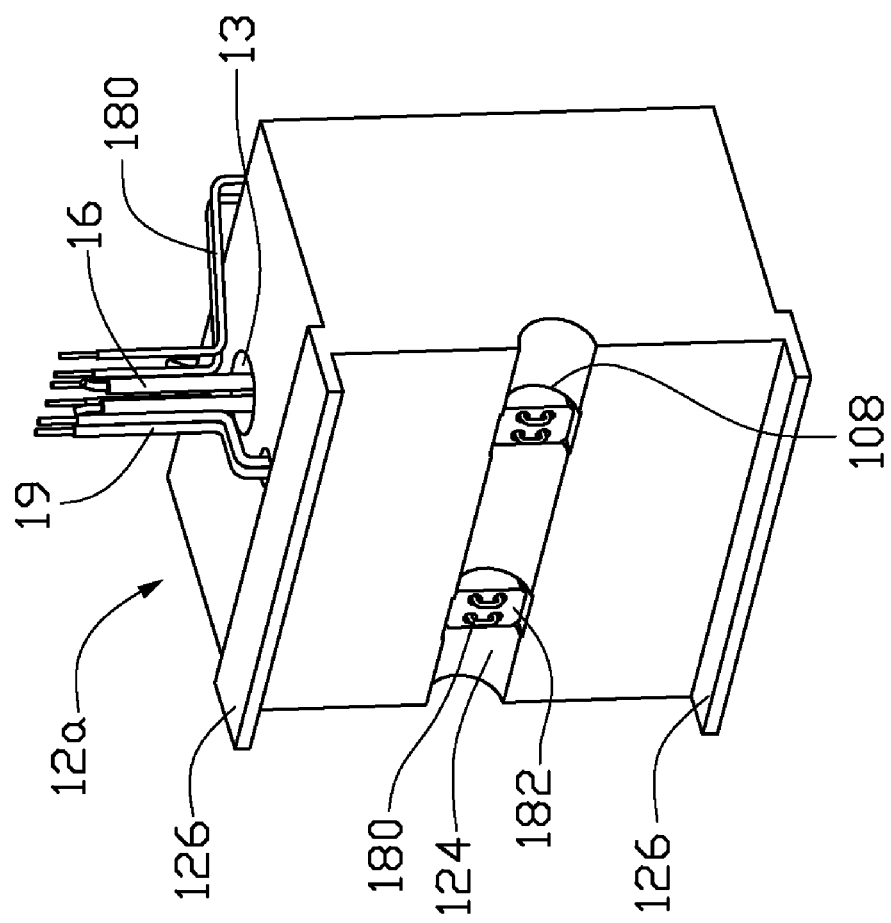
FIG. 5 is an assembled view of the immovable portion of the heating set of FIG. 4.

Referring to FIGS. 4 and 5, an alternative first immovable portion 12a is shown. The first immovable portion 12a has a configuration similar to that of the immovable portion 12; a difference therebetween is that the first immovable portion 12a extends two flanges 126 from two opposite sides thereof. The flanges 126 and a main body (not labeled) of the first immovable portion 12a are made from one piece of metal block. Each of the flanges 126 extends from corresponding outer face of the main body of the immovable portion 12a. The inner face of each of the flanges 126 is in coplanar with a corresponding outer face of the main body. The first movable portion 14 can be accommodated between the two flanges 126 and slide along the two flanges 126. Two second temperature sensors 18 are disposed into the through holes 108, respectively. Each of the two temperature sensors 18 comprises a positioning socket 182 and a pair of thermocouple wires 180 fitted in the socket 182. The socket 182 comprises a square column 1822, a circular column 1824 above the square column 1822, and a circular collar 1826 between the square column 1822 and the circular column 1824. The socket 182 has two pairs of through apertures (not labeled) extending through the socket 182 from the square column 1822 to the circular column 1824. Each wire 180 has two latitudinal sections (not labeled) extending into the apertures of the socket 182 and a detecting section (not labeled) between the two latitudinal sections thereof. The detecting sections (not labeled) are exposed to the groove 124 of the first immovable portion 12a. Each wire 180 has a connecting section extending from one of the two latitudinal sections and through an orifice 1862 of a screw 186 to connect with the monitoring computer (not shown). The hole 108 has a figure similar to the socket 182. A spring coil 184 surrounds the circular column 1824. The spring coil 184 is compressed by the screw 186 engaging in the hole 108 of the first immovable portion 12a. The detecting sections are capable of automatically contacting the evaporating section of the heat pipe to detect the temperature of the evaporating section.

Figure 6:
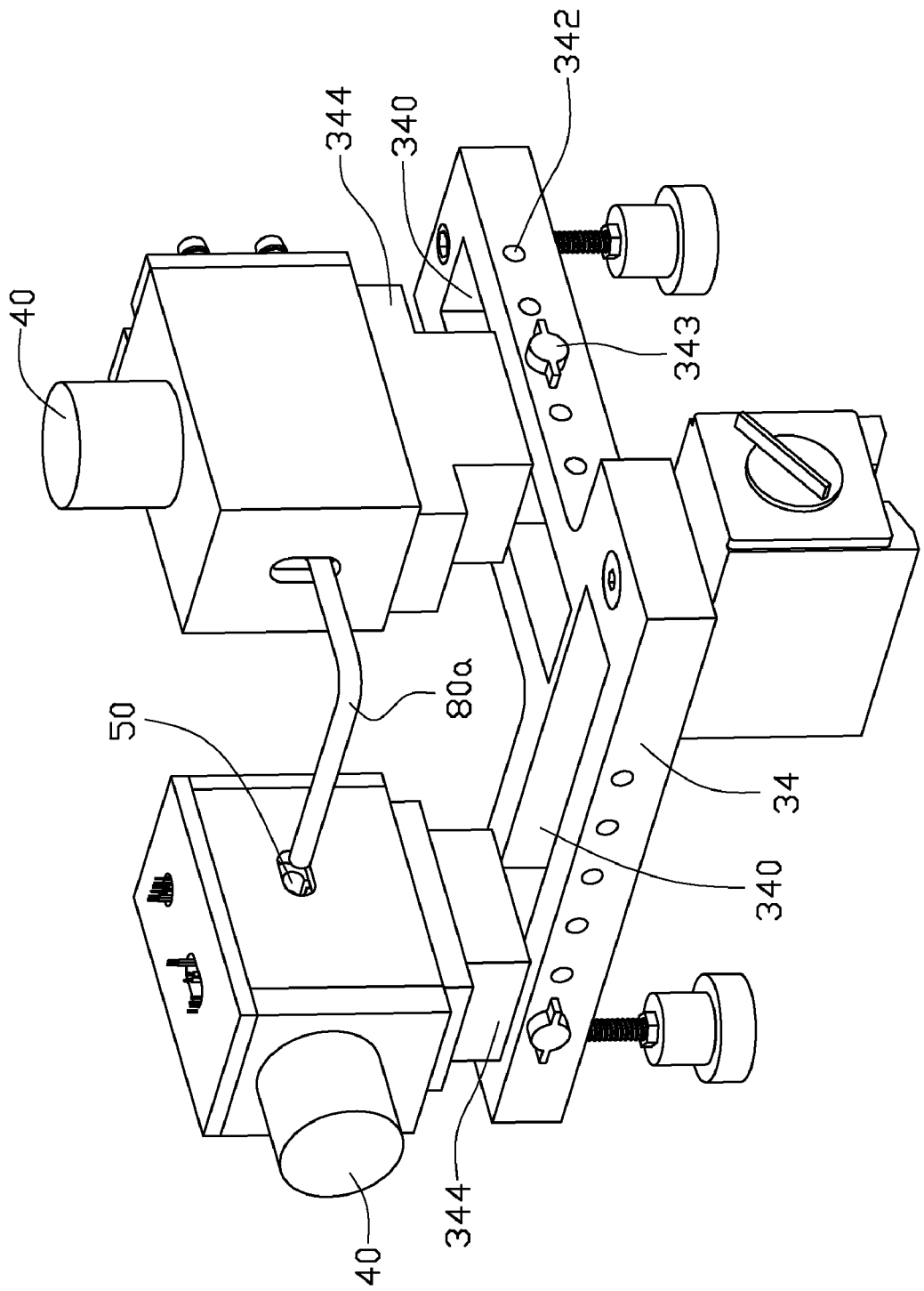
FIG. 6 is a performance testing apparatus for heat pipes in accordance with a second embodiment of the present invention.
Figure 7:
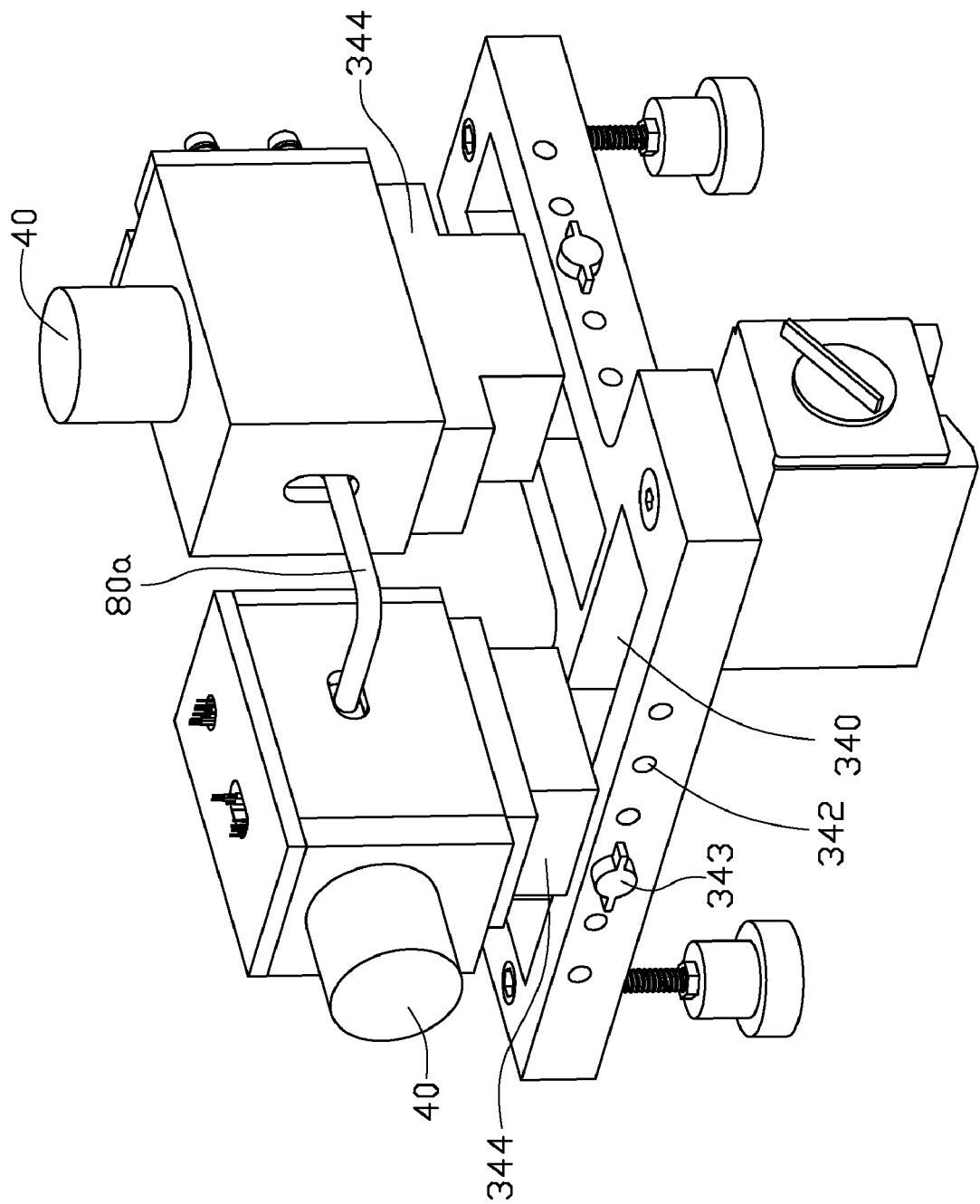
FIG. 7 is the performance testing apparatus for heat pipes of FIG. 6 in a different state.

Referring to FIGS. 6 and 7, a performance testing apparatus for heat pipes in accordance with a second embodiment of the present invention is shown. The second embodiment is similar to the first embodiment; a difference therebetween is that the second embodiment is used to test performance of an L-shaped heat pipe 80a. The heat pipe 80a has an evaporating section and a condensing section substantially perpendicular to the evaporating section. When the heat pipe 80a is tested, the supporting set 30 is adjusted, wherein, in comparison with the first embodiment, the supporting seat 344 supporting the heating set 10 is rotated 90 degrees to make the first channel 50 of the heating set 10 perpendicular to the second channel 60 of the cooling set 20. The two supporting seats 344 are secured to the supporting platform 34 via the bolts 343 threadedly and securely engaging with the supporting seats 344. The evaporating section of the heat pipe 80a extends through an inner one of the openings 362 of the sidewalls of the first enclosure 36 and is received in the first channel 50 of the heating set 10. The condensing section of the heat pipe 80a extends through the opening 382 of one of the sidewalls of the second enclosure 38 and is received in the second channel 60 of the cooling set 20. The driving devices 40, the heating set 10, the cooling set 40 and the temperature sensors 18 work, and performance of the heat pipe 80a is obtained from the monitoring computer.

Figure 8:
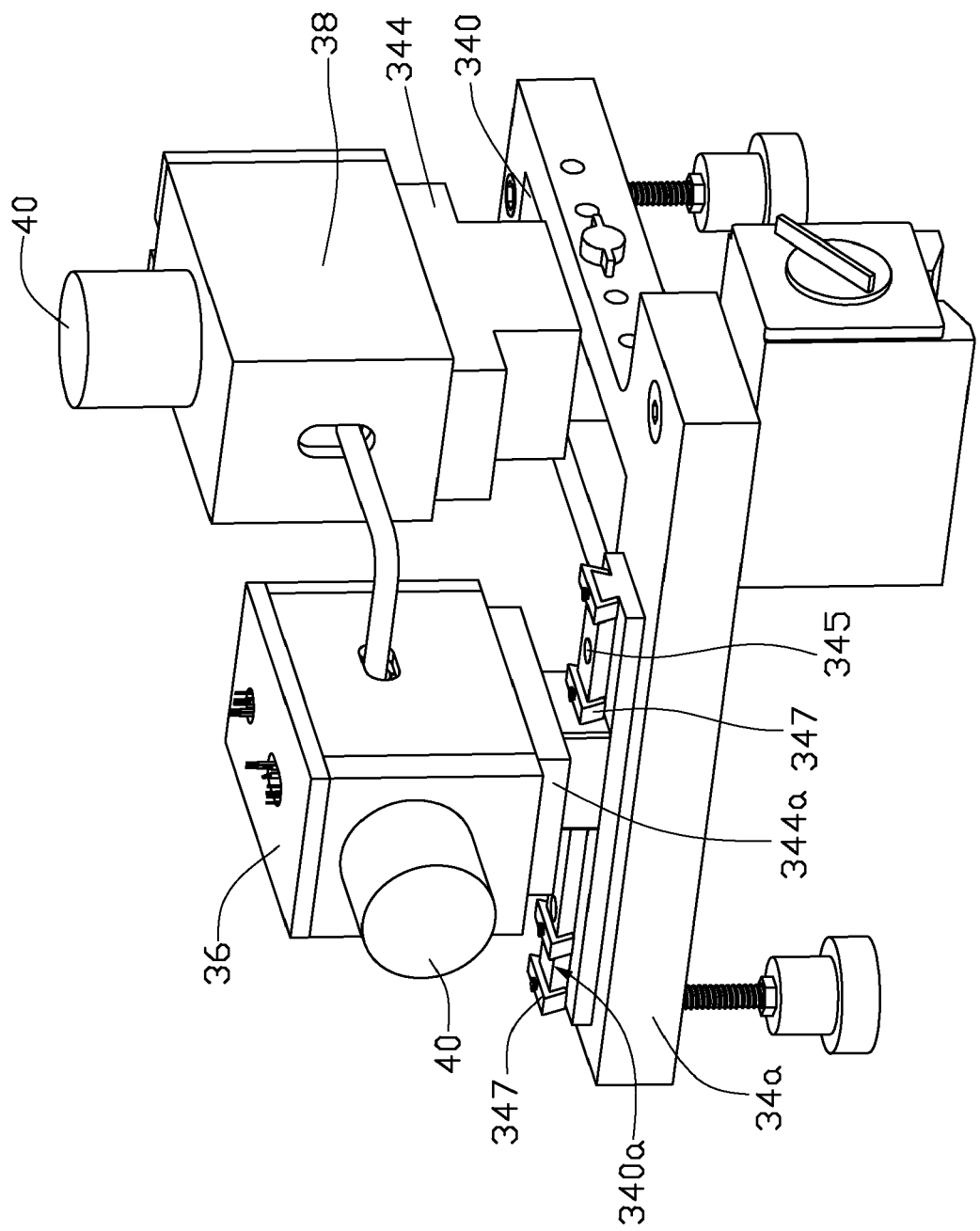
FIG. 8 is a performance testing apparatus for heat pipes in accordance with a third embodiment of the present invention.

Referring to FIG. 8, a performance testing apparatus for heat pipes in accordance with a third embodiment of the present invention is shown. The third embodiment has a configuration similar to that of the second embodiment; a difference therebetween is that the guiding slot 340 of the supporting platform 34 of the second embodiment is replaced by a guiding rail 340a of a supporting platform 34a of the third embodiment. The guiding rail 340a is a linear member fixed to the supporting platform 34a via two screws (not shown) engaging in corresponding two counterbores 345 of the guiding rail 340a and the supporting platform 34a. The guiding rail 340a has an inverted T-shaped cross section. The supporting seat 344a slideably rides on the guiding rail 340a via an elongated slot (not shown) defined in a bottom of the supporting seat 344a engagingly receiving the guiding rail 340a therein. A plurality of inverted U-shaped positioning members 347 rides on the guiding rail 340a and can be secured to the guiding rail 340a at desired positions. Two of the positioning members 347 are locked to the guiding rail 340a at two opposite sides of the supporting seat 344a, respectively, for keeping the supporting seat 344a fixedly secured in position in respect to the guiding rail 340a when the heat pipe is tested. In use, the supporting seat 344a and the heating set 10 slides along the guiding rail 340a by pushing the supporting seat 344a and is located at different positions of the guiding rail 340a according to difference sizes of heat pipes in test.

Figure 9:
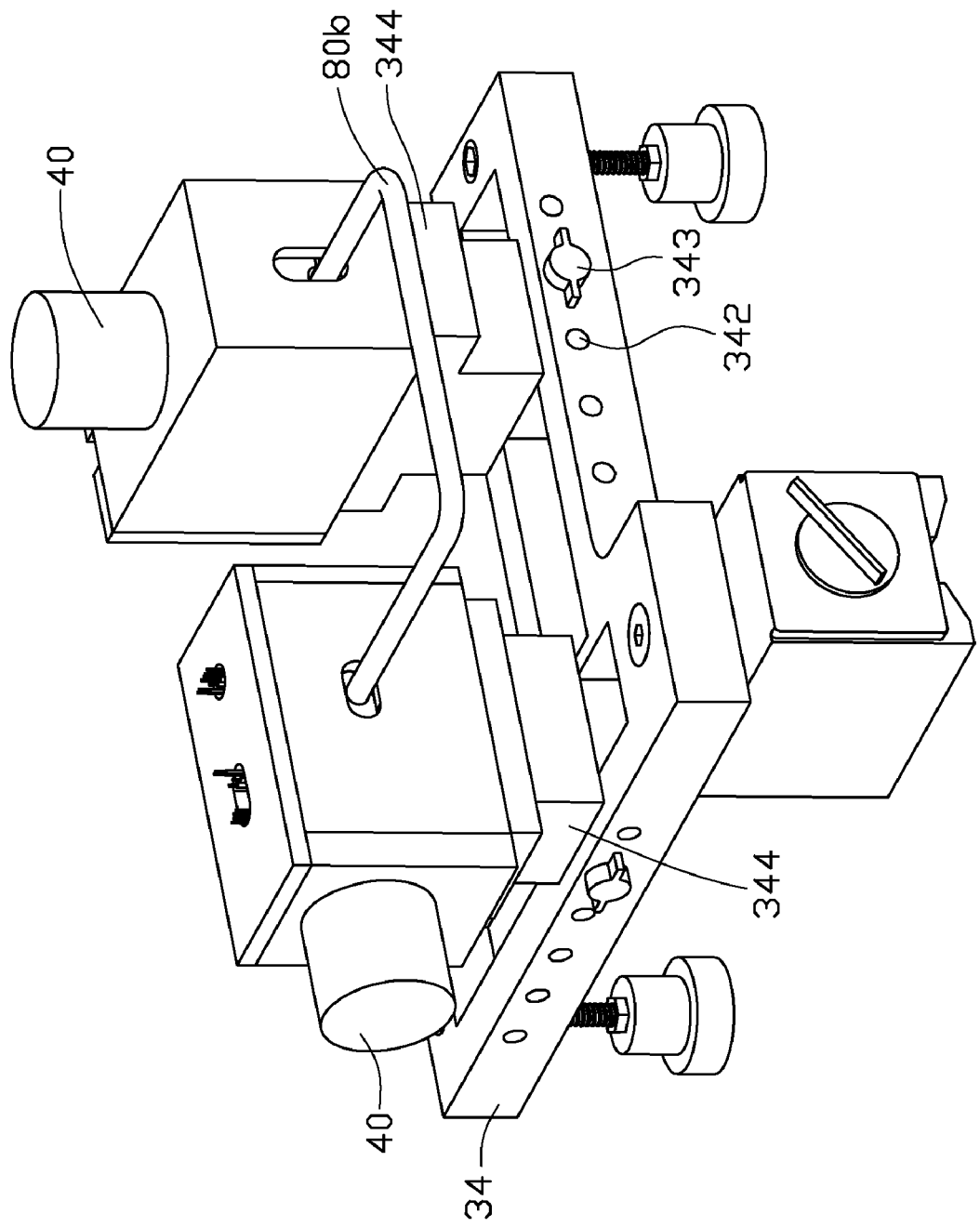
FIG. 9 is a performance testing apparatus for heat pipes in accordance with a fourth embodiment of the present invention.
Figure 10:
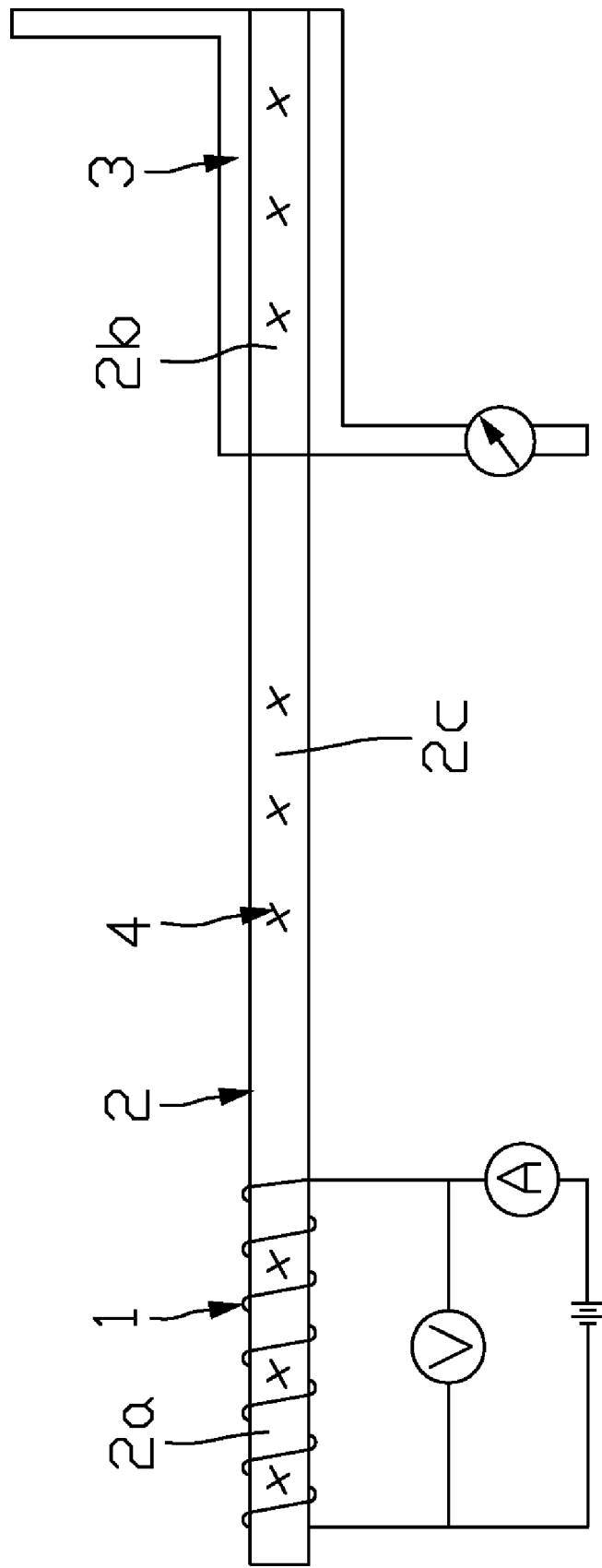
FIG. 10 is a performance testing apparatus for heat pipes in accordance with related art.

Referring to FIG. 9, a performance testing apparatus for heat pipes in accordance with a fourth embodiment of the present invention is shown. The fourth embodiment is similar to the first embodiment; a difference therebetween is that the fourth embodiment is used to test performance of a U-shaped heat pipe 80b. The heat pipe 80b has an evaporating section, a condensing section parallel to the evaporating section and a connecting section connecting the evaporating section and the condensing section. When the heat pipe 80b is tested, the supporting set 30 is adjusted, wherein, in comparison with the first embodiment, the supporting seats 344 are rotated 90 degree to make the first channel 50 of the heating set 10 parallel to the second channel 60 of the cooling set 20. The two supporting seats 344 are secured with the supporting platform 34 via the bolts 343 threadedly and securely engaging with the supporting seats 344. The evaporating section of the heat pipe 80b extends through the opening 362 of the sidewall of the first enclosure 36 and is received in the first channel 50 of the heating set 10. The condensing section of the heat pipe 80b extends through the opening 382 of the sidewall of the second enclosure 38 and is received in the second channel 60 of the cooling set 20. The driving devices 40, the heating set 10, the cooling set 20 and the temperature sensors 18 work, and performance of the heat pipe 80b is obtained from the monitoring computer (not shown).

Additionally, in the present invention, in order to lower cost of or simplify manufacture of the testing apparatus, the socket 182, the supporting platform 34 and the first enclosure 36 can be made from low-cost material such as PE (Polyethylene), ABS (Acrylonitrile Butadiene Styrene), PF (Phenol-Formaldehyde), PTFE (Polytetrafluoroethylene) and so on. The first, second immovable portions 12, 22, the first, second movable portions 14, 24 can be made from copper (Cu) or aluminum (Al). The first, second immovable portions 12, 22, the first, second movable portions 14, 24 can have silver (Ag) or nickel (Ni) plated on inner faces defining the channels 50, 60 to prevent oxidization of the inner face.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:

a heating set for heating an evaporating section of the heat pipe, the heating set comprising a first immovable portion, a first movable portion capable of moving horizontally relative to the first immovable portion, a first channel being defined between the first immovable portion and the first movable portion for receiving the evaporating section of the heat pipe, and a temperature sensor being attached to one of the first immovable portion and the first movable portion and exposed to the first channel for detecting temperature of the evaporating section of the heat pipe, a heating member being received in one of the first immovable portion and the first movable portion, the temperature sensor being perpendicular to the heating member;

a cooling set for cooling a condensing section of the heat pipe, the cooling set comprising a second immovable portion, a second movable portion capable of moving vertically relative to the second immovable portion, a second channel being defined between the second immovable portion and the second movable portion for receiving the condensing section of the heat pipe, and a temperature sensor being attached to one of the second immovable portion and the second movable portion and exposed to the second channel for detecting temperature of the condensing section of the heat pipe; and a supporting set adjustably supporting the heating set and the cooling set thereon;

wherein the supporting set comprises a supporting platform, a supporting leg supporting the platform thereon, and two supporting seats located on the platform, the heating set and the cooling set being seated on the two supporting seats, respectively.

2. The testing apparatus of claim 1, wherein the first channel is cooperatively defined by a groove defined in the first immovable portion and a groove defined in the first movable portion.

3. The testing apparatus of claim 1, wherein the second channel is cooperatively defined by a groove defined in the second immovable portion and a groove defined in the second movable.

4. The testing apparatus of claim 1, wherein the supporting leg comprises a electromagnetic holding chuck supporting at an end of the platform, two adjustable feet supporting at two other ends of the platform.

5. The testing apparatus of claim 1, wherein the heating set is received in an enclosure mounted on one of the supporting seats.

6. The testing apparatus of claim 5, wherein the first movable portion of the heating set is driven by a driving device mounted outside the enclosure and engaging with the first movable portion.

7. The testing apparatus of claim 1, wherein the cooling set is received in an enclosure mounted on one of the supporting seats.

8. The testing apparatus of claim 7, wherein the second movable portion of the cooling set is driven by a driving device mounted outside the enclosure and engaging with the second movable portion.

9. The testing apparatus of claim 1, wherein one of the supporting seats is capable of linearly moving on the platform.

10. The testing apparatus of claim 9, wherein orientation of at least one of the supporting seats is adjustable.

11. The testing apparatus of claim 9, wherein the platform forms a guiding rail thereon, the at least one of the supporting seats engaging with the guiding rail.

12. The testing apparatus of claim 11, wherein the at least one of the supporting seats defines a slot facing to the guiding rail, and the at least one of the supporting seats rides on the guiding rail via the slot engagingly receiving the guiding rail therein.

13. The testing apparatus of claim 9, wherein the platform defines a guiding slot receiving a portion of the at least one of the supporting seats therein.

14. The testing apparatus of claim 13, wherein the at least one of the supporting seats is fixedly positioned on the platform by a bolt engaging with the platform and the at least one of the supporting seats.

15. The testing apparatus of claim 14, wherein the platform in a lateral side thereof defines a plurality of holes communicating with the guiding slot, and the bolt engages in a corresponding one of the holes and engages the at least one of the supporting seats.

16. A performance testing apparatus for a heat pipe comprising:
a heating set for heating an evaporating section of the heat pipe, the heating set comprising a first immovable portion, a first movable portion capable of moving horizontally relative to the first immovable portion, a first channel being defined between the first immovable portion and the first movable portion for receiving the evaporating section of the heat pipe, and a temperature sensor being attached to one of the first immovable portion and the first movable portion and exposed to the first channel for detecting temperature of the evaporating section of the heat pipe, a heating member being received in one of the first immovable portion and the first movable portion, the temperature sensor being perpendicular to the heating member;
a cooling set for cooling a condensing section of the heat pipe, the cooling set comprising a second immovable portion, a second movable portion capable of moving vertically relative to the second immovable portion, a second channel being defined between the second immovable portion and the second movable portion for receiving the condensing section of the heat pipe, and a temperature sensor being attached to one of the second immovable portion and the second movable portion and exposed to the second channel for detecting temperature of the condensing section of the heat pipe; and
a supporting set adjustably supporting the heating set and the cooling set thereon;
wherein the first channel is cooperatively defined by a groove defined in the first immovable portion and a groove defined in the first movable portion.

17. A performance testing apparatus for a heat pipe comprising:
a heating set for heating an evaporating section of the heat pipe, the heating set comprising a first immovable portion, a first movable portion capable of moving horizontally relative to the first immovable portion, a first channel being defined between the first immovable portion and the first movable portion for receiving the evaporating section of the heat pipe, and a temperature sensor being attached to one of the first immovable portion and the first movable portion and exposed to the first channel for detecting temperature of the evaporating section of the heat pipe, a heating member being received in one of the first immovable portion and the first movable portion, the temperature sensor being perpendicular to the heating member;
a cooling set for cooling a condensing section of the heat pipe, the cooling set comprising a second immovable portion, a second movable portion capable of moving vertically relative to the second immovable portion, a second channel being defined between the second immovable portion and the second movable portion for receiving the condensing section of the heat pipe, and a temperature sensor being attached to one of the second immovable portion and the second movable portion and exposed to the second channel for detecting temperature of the condensing section of the heat pipe; and
a supporting set adjustably supporting the heating set and the cooling set thereon;
wherein the second channel is cooperatively defined by a groove defined in the second immovable portion and a groove defined in the second movable.

* * * * *